UNITED STATES PATENT OFFICE.

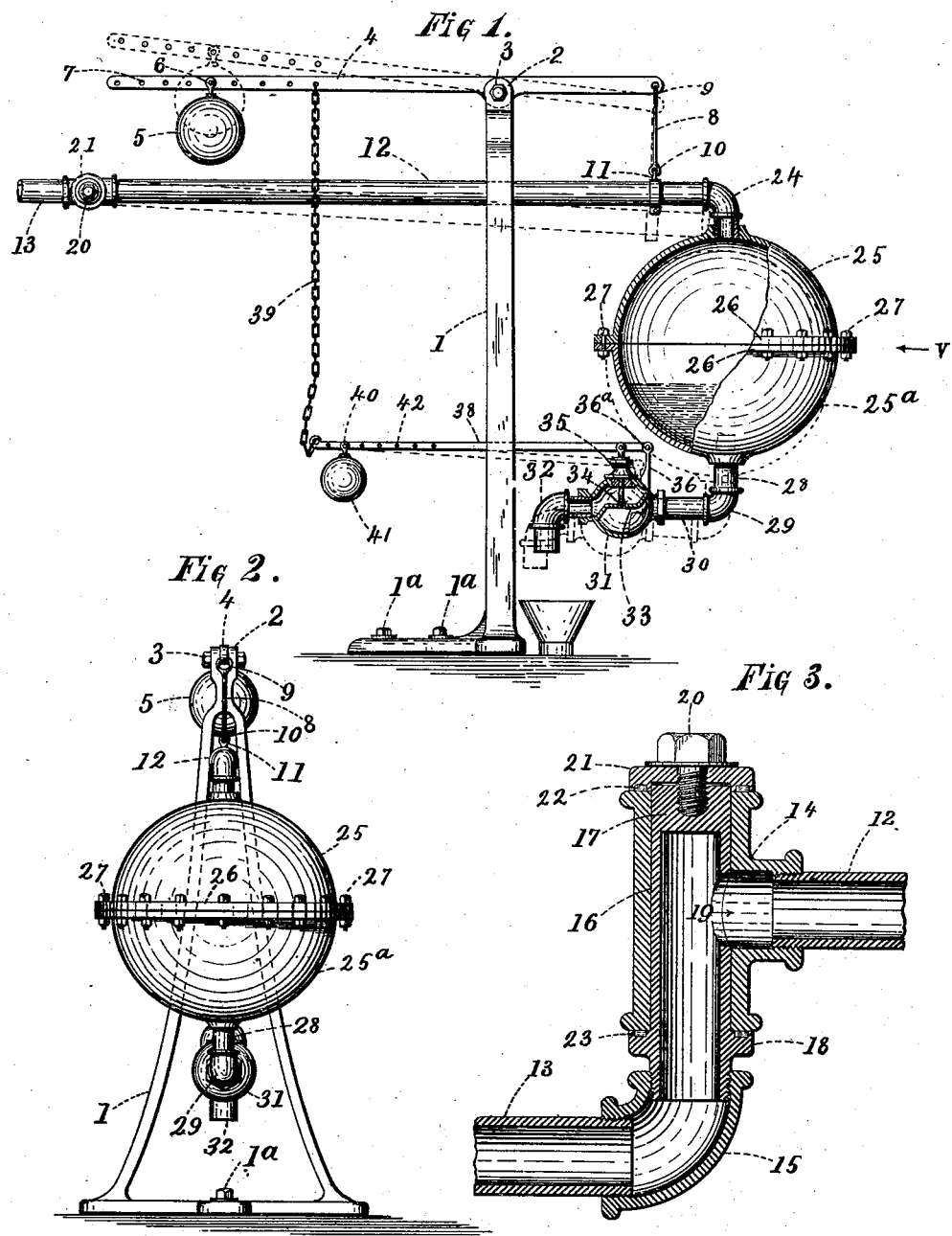

JOSEPH ZIMMERMAN, OF BUFFALO, NEW YORK.

STEAM-TRAP.

SPECIFICATION forming part of Letters Patent No. 506,760, dated October 17, 1893.

Application filed December 26, 1891. Serial No. 416,137. (No model.)

*To all whom it may concern:*

Be it known that I, JOSEPH ZIMMERMAN, a citizen of the United States, residing in Buffalo, in the county of Erie and State of New York, have invented certain new and useful Improvements in Steam-Traps, of which the following is a specification.

My invention relates to certain improvements in automatically acting steam traps whereby the trap is rendered more certain in its action, and it will be fully and clearly hereinafter described and claimed, reference being had to the accompanying drawings, in which—

Figure 1 is a side elevation of the trap complete a portion of the water holding vessel and a portion of the valve chamber shell being broken away to show the interior of each. Fig. 2 is an end elevation of the trap, looking in the direction of the arrow V, Fig. 1. Fig. 3 is an enlarged longitudinal central sectional elevation through the joint by which the trap pipe is connected to the steam pipe.

Referring to the drawings, the supporting frame 1, shown in Figs. 1 and 2, is constructed preferably of cast iron as being the best and cheapest material, but any other suitable material may be used and it may be made in any suitable form sufficiently strong to support the trap. I have shown it adapted to be secured in place by bolts 1ª, at the base, but any other device may be used as a support. At the top is a forked portion, 2, in which is pivoted by a pin or bolt, 3, a beam, 4. This beam, 4, is provided with a counterweight, 5, which is secured thereto by a removable pin, 6, (see Fig. 1,) a series of holes, 7, permitting the counterweight to be removed and adjusted to any one desired. At the opposite end of the beam, 4, is a chain, or connecting rod, 8. This connecting-rod, 8, is pivoted to the beam, 4, by means of a loop, 9, (more plainly shown in Fig. 2.) The opposite end of the connecting-rod, 8, is secured by a loop or eye piece, 10, to a loop or eye piece, 11, on the trap-pipe, 12, for the purpose of holding that end of the trap pipe up. The opposite end of the trap pipe is secured to a steam pipe, 13. The trap pipe, 12, is connected with the steam pipe by means of a steam tight movable joint constructed as follows, see Fig. 3, where the construction is better shown.

The trap pipe, 12, is rigidly connected to a T pipe, 14. On the steam pipe, 13, is an elbow, 15, which is rigidly attached to a pipe, 16, having the end, 17, closed and the opposite end provided with a collar, 18. It is also provided with an opening 19, which communicates with the trap pipe, 12. At the closed end, 17, is a set screw, 20, which passes through a cap, 21, and screws into the end, 17. Between the cap, 21, and the collar, 18, may be placed a packing of any well known material 22 and 23, or a well known ground joint may be used. It will be seen by the above construction that by tightening the set screw, 20, the joint may be made steam tight and at the same time allow the trap pipe to be moved up or down. The joint described above as a suitable joint for this purpose, is in itself a separate and distinct invention and is therefore not claimed herein.

On the outer end of the trap pipe is an elbow 24, to which is rigidly attached a spherical water vessel, 25. This water vessel consists of two semispherical hollow portions 25, and 25ª. Each half is provided with a flange, 26, and is secured together by bolts, 27. At the bottom of this water vessel is a pipe, 28, secured to an elbow, 29, to which is secured a short pipe, 30, having rigidly secured a valve case, 31, provided with an outlet nozzle, 32. This valve case, 31, is provided with an interior diaphragm, 33, (see Fig. 1,) and a valve, 34, the stem of which projects up through a well known stuffing box, 35. To the rear side of the valve case, 31, is a supporting standard 36 to which is pivoted by a pin, 36ª, an arm or beam, 38. The extreme end of the beam, 38, is connected by a chain, 39, with the beam, 4, substantially as shown. On the beam, 38, is secured by a pin 40, a counter weight, 41, which may be adjusted to any of the holes, 42, in said beam. By the above described construction, it will be seen that when all the counter-weights are properly adjusted and the water vessel 25 and 25ª, is free from water, the trap will be in the position shown in Fig. 1 and that when sufficient water condenses and collects in the water vessel 25— 25ª, the additional weight of the water will overcome the counter-weight 5 and 41, and cause the several parts to assume substantially the position shown by the dotted lines in Fig. 1, the water vessel descending while the counter-weight side of the beam, 4, rises and through the chain 39, lifts the end of the beam, 38, and consequently the valve, 34, off from its seat. This operation allows the water in the water vessel to run through the valve and out through the nozzle, 32, until it becomes sufficiently light to allow the several parts to resume their normal position, which operation is repeated as often as sufficient water condenses and accumulates in the water vessel. By the above construction, only one flexible joint is needed, as the water vessel 25 is rigidly secured to the end of the pipe 12 and the valve case 31 is rigidly secured to the vessel, so that in their vertical movement they swing in the arc of a circle with the T pipe 14 as a center. As the connections between the beam 4 and the pipe 12 and the beam 38 are flexible, they do not interfere with or obstruct the free movement of the parts to which they are connected, in the least.

I claim as my invention—

In a steam trap, the combination, of a standard, a beam pivotally secured thereto, one end of which is provided with an adjustable counter weight, a pipe suspended from the opposite end of said beam, one end of which is pivotally secured to a steam pipe, a water vessel rigidly secured to the free end of the suspended pipe, a valve case rigidly secured to the bottom of the water vessel, a beam pivotally connected with the valve and the valve case, a counter weight thereon, and a flexible connection between said beams, substantially as set forth.

JOSEPH ZIMMERMAN.

Witnesses:
JAMES SANGSTER,
ARTHUR J. SANGSTER.